United States Patent
Ramanathan et al.

(10) Patent No.: US 8,438,353 B1
(45) Date of Patent: *May 7, 2013

(54) METHOD, SYSTEM, AND COMPUTER READABLE MEDIUM FOR ASYNCHRONOUSLY PROCESSING WRITE OPERATIONS FOR A DATA STORAGE VOLUME HAVING A COPY-ON-WRITE SNAPSHOT

(75) Inventors: Prem Anand Ramanathan, Pune (IN); Niranjan Sanjiv Pendharkar, Pune (IN); Subhojit Roy, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/180,190

(22) Filed: Jul. 11, 2011

Related U.S. Application Data (63) Continuation of application No. 11/482,925, filed on Jul. 7, 2006, now Pat. No. 7,979,651.

(51) Int. Cl.
*G06F 12/00* (2006.01)

(52) U.S. Cl.
USPC ............ 711/162; 711/112; 714/E11.107; 714/E11.108

(58) Field of Classification Search .................. None
See application file for complete search history.

(56) References Cited

U.S. PATENT DOCUMENTS

2005/0071372 A1* 3/2005 Bartfai et al. ............. 707/104.1
2006/0136685 A1* 6/2006 Griv et al. ..................... 711/162

\* cited by examiner

*Primary Examiner* — Yaima Campos
*Assistant Examiner* — Thanh D Vo
(74) *Attorney, Agent, or Firm* — Campbell Stephenson LLP (57) ABSTRACT

A method, system, and computer readable medium for asynchronously processing write operation on a volume having copy-on-write snapshots. In one embodiment, the method comprises the steps of: updating a normal mirror with write data associated with a write operation for the volume; asynchronously copying the write data from an asynchronous mirror to at least one copy-on-write snapshot; and, once the at least one copy-on-write snapshot is updated, updating the asynchronous mirror with the write data from the normal mirror.

20 Claims, 5 Drawing Sheets

METHOD, SYSTEM, AND COMPUTER READABLE MEDIUM FOR ASYNCHRONOUSLY PROCESSING WRITE OPERATIONS FOR A DATA STORAGE VOLUME HAVING A COPY-ON-WRITE SNAPSHOT

CROSS-REFERENCE TO RELATED APPLICATION

This application is a continuation of U.S. patent application Ser. No. 11/482,925 (which will issue as U.S. Pat. No. 7,979,651, on Jul. 12, 2011), entitled "Method, System, and Computer Readable Medium For Asynchronously Processing Write Operations For A Data Storage Volume Having A Copy-On-Write Snapshot," filed Jul. 7, 2006, naming Prem Anand Ramanathan, Niranjan Sanjiv Pendharkar, and Sub-Hojit Roy as the inventors, and assigned to Symantec Operating Corporation, the assignee of the present invention. This application is hereby incorporated by reference in its entirety and for all purposes as if completely and fully set forth herein.

BACKGROUND OF THE INVENTION

1. Field of the Invention

Embodiments of the present invention generally relate to data storage and, more particularly to a method, system, and computer readable medium for asynchronously processing write operations for a data storage volume that utilizes copy-on-write (COW) snapshots.

2. Description of the Related Art

In information sharing and processing environments, many businesses employ data processing systems for storing and processing data. Often, the viability of a business depends on the reliability of access to data contained within its data processing system. As such, businesses seek reliable and efficient ways to consistently protect their data processing systems and the data contained therein from natural disasters, acts of terrorism, and unauthorized access, or computer hardware and/or software failures. Data backup systems have been used for the protection of data by minimizing or eliminating loss of data, thereby forming an important aspect of business strategy and a key element in information sharing and processing environments.

Data backup technologies, such as, snapshot and mirroring, have been used to improve performance of the data backup systems in terms of backup as well as recovery, i.e., such data backup technologies not only minimize or eliminate loss of data, but also enable rapid recovery of a data processing system when compared to conventional bulk transfer methods from sequential media, for example, tape drives, and the like.

A snapshot is a virtual point-in-time (PIT) backup copy of a data storage volume. A snapshot creates an instant backup that provides a PIT copy of the volume. By repeating the snapshot creation process, a sequence of snapshots is created containing a historical record of volume content. This sequence of snapshots provides the ability to access data instantly, at any point within the historical record; unlike tape-based backups. Snapshots may be used to support various functions including remote replication, business continuance, and rapid application development and support for regulatory requirements.

Snapshots may be independent or dependent. Independent snapshots contain a complete copy of the volume from which they are created, while dependent snapshots generally contain changes (modified blocks) to the data on the volume that have occurred since a prior snapshot, either dependent or independent, was created.

To improve data access to the volume, requests may be handled partially or completely by the snapshots. However, when performing a read operation on a dependent snapshot, unmodified blocks are read from the volume and modified blocks are read from one or more snapshots. One form of dependent snapshot is known as a copy-on-write snapshot. With a copy-on-write snapshot, each time a write operation is performed in the volume, the contents of the original file, as of the time the snapshot was made prior to the current write operation, are preserved in a snapshot volume. In other words, all the blocks that are modified in the file are copied to the snapshot volume when writing to the file in the volume. Since copy-on-write snapshots read the data from the volume, there is a performance degradation while the data is being copied to the snapshot.

In such cases, when a write operation is initiated by an application and received at the volume, the old data is copied to a snapshot volume before the new data is written to the volume. This process causes a delay in completing the write operation on the volume. Since copy-on-write occurs synchronously with the write operation, the write operation initiated by an application itself suffers degradation. Furthermore, when a volume has dependent snapshots, the write operation on the volume is completed only after all the dependent snapshots have been updated, thereby increasing the write latency of such volumes.

Attempts have been made to reduce write latency on volumes using copy-on-write snapshots, including the use of a Distributed Front End Log (DFEL). However, DFEL requires a special type of log whose redundancy level has to be the same as the volume. All read/write activity must flow through the log, thereby making the log itself a bottleneck for volume and snapshot update activity.

Therefore, there is a need in the art for a method and apparatus to reduce write latency of volumes having copy-on-write snapshot(s).

SUMMARY OF THE INVENTION

The present invention provides a method, system and computer readable medium for asynchronously processing a write operation for a data storage volume having at least one copy-on-write snapshot, comprising updating a normal mirror with write data associated with a write operation for the volume, where an asynchronous mirror is synchronized with the normal mirror(s) prior to the write operation; asynchronously copying the write data from the asynchronous mirror to at least one copy-on-write snapshot; and, once the at least one copy-on-write snapshot is updated, updating the asynchronous mirror with the write data from the normal mirror.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

The present invention provides a method, system, and a computer program product for asynchronously processing a write operation for a data storage volume having at least one copy-on-write (hereinafter referred as COW) snapshot. The present invention may be employed in both single host (non-distributed) and multi-host (distributed) environments. The present invention reduces write latency of the volumes having COW snapshots. The COW snapshots may be space saving snapshots or non-space saving snapshots. As used herein, the space saving snapshots are snapshots that are indexed to reduce the amount of memory space consumed by the snapshot. Further, the present invention reduces the network traffic associated with the read operation in a multi-host environment and decreases the recovery time in the event of a system crash, thereby improving the overall efficiency of the data backup process.

Figure 1:
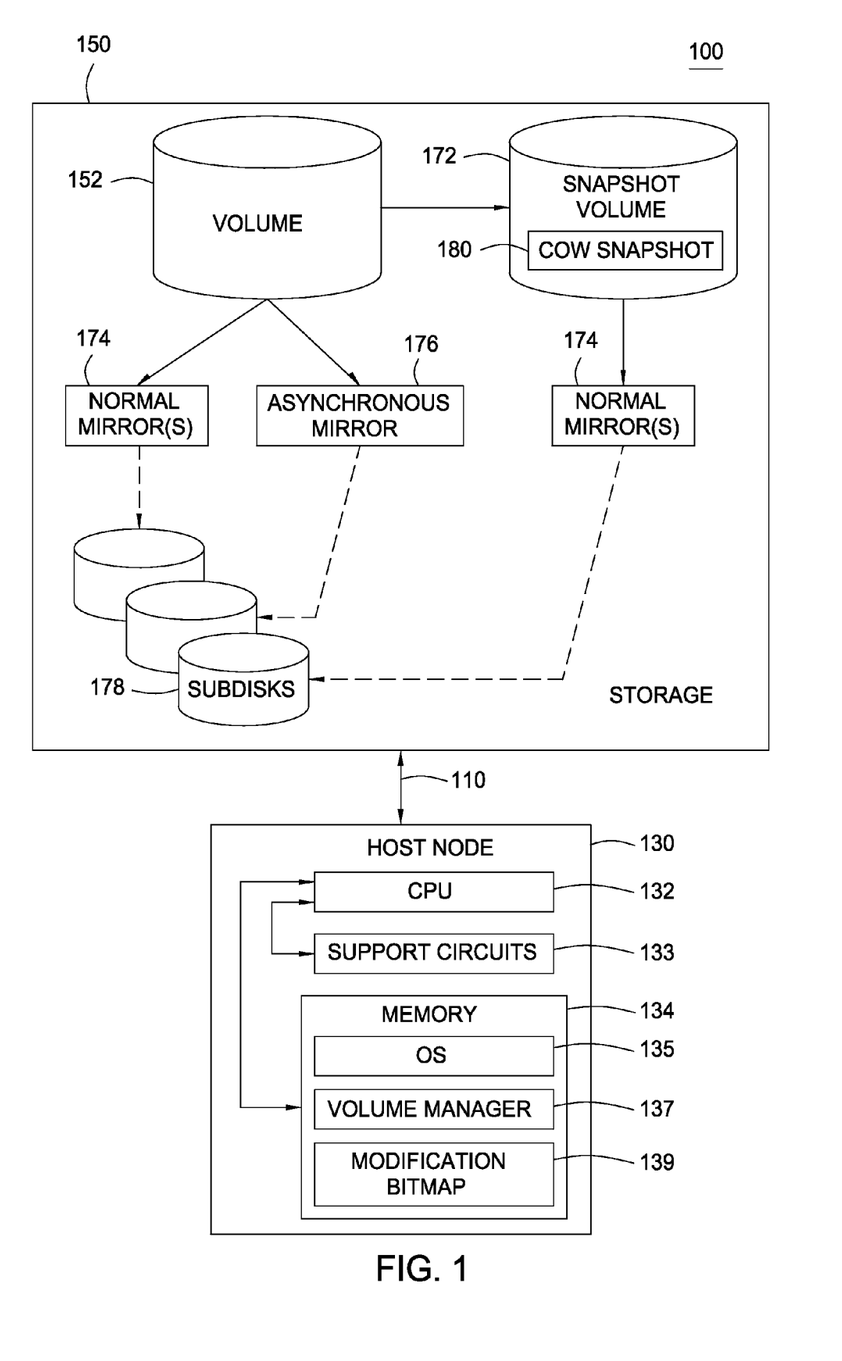
FIG. 1 is a block diagram of a single host system for asynchronously processing a write operation for a data storage volume having at least one copy-on-write snapshot, according to an exemplary embodiment of the present invention.

FIG. 1 illustrates a block diagram of a single host (non-distributed) system 100 for asynchronously processing at least one write operation for a volume 152 having at least one COW snapshot 180. The single host system 100 comprises a host node 130, coupled via a communications network 110 to at least one storage unit 150 comprising the volume 152. The host node 130 may take the form of a computer system, for example, a client computer system or a server computer system. The host node 130 may also communicate with virtualization switches, or storage arrays, or a device that creates/manages logical volumes and snapshots using the underlying storage.

The host node 130 comprises at least one central processing unit (CPU) 132, support circuits 133, and memory 134. The CPU 132 comprises at least one microprocessor or microcontroller. The support circuits 133 are well-known circuits that support the operation of the CPU 132 including but not limited to, power supplies, clocks, cache, input/output circuits, network cards, and the like. The memory 134 may include dynamic or static random access memory, magnetic or optical data storage disks, or magnetic or optical data storage tapes, and the like. Other processing and memory means, including various computer readable media, may be used for storing and executing program instructions. The memory 134 stores executable software such as an operating system (OS) 135, a volume manager 137 and a modification bitmap 139. The volume manager 137 provides logical volume management functionality, in the form of programmable instructions executing on one or more processors 132. The volume manager 137 manages the distribution of data across several memory devices and may support various specific storage management functionality, such as various levels of Redundant Array of Independent Disks (RAID) functionality including data mirroring, striping, and the like.

The communication network 110 may comprise telephone lines, fiber optic lines, Small Computer System Interface (SCSI) cable, Ethernet, wireless communication lines and the like. The host node 130 stores and retrieves data by sending access requests to the storage unit 150 via the network 110.

The data storage volume 152 is a logical unit of storage 150 and may be formed by a portion of the overall storage of a physical device, by the storage of an entire physical device or by the storage of multiple physical devices combined together. For instance, the volume 152 may include an array of storage devices, as desired. The volume 152 comprises a plurality of mirrors (additional volumes that contain duplicates of the data stored on volume 152), which in turn is a logical grouping construct consisting of a plurality of sub-disks 178. The subdisks 178 may be a portion of actual physical disks or from other volumes. The volume manager 137 provides functionality to create a snapshot 180 of the volume 152 by sequentially storing each data block within the volume 152 to the snapshot 180. The storage 150 further comprises a snapshot volume 172 (containing the at least one COW snapshot 180), at least one normal mirror 174, and an asynchronous mirror 176. A backup storage (not shown) may be present in a remote location to store copies of the data on the volume 152. The snapshot volume 172 is a virtual volume that represents the data that existed on the volume 152 at the point-in-time (PIT) a snapshot was created ("taken").

The volume manager 137 provides an improved write operation using a COW snapshot 180 in combination with the normal mirror 174 and the asynchronous mirror 176. The details of the write operation is described below with respect to FIGS. 3, 4, and 5. Although a "host node" volume manager is shown and discussed herein as executing on a computer system, the invention is applicable to any logical volume manager. Those skilled in the art will understand that the host node 130 may be a virtualization switch, storage array or any device that performs logical volume management.

Figure 2:
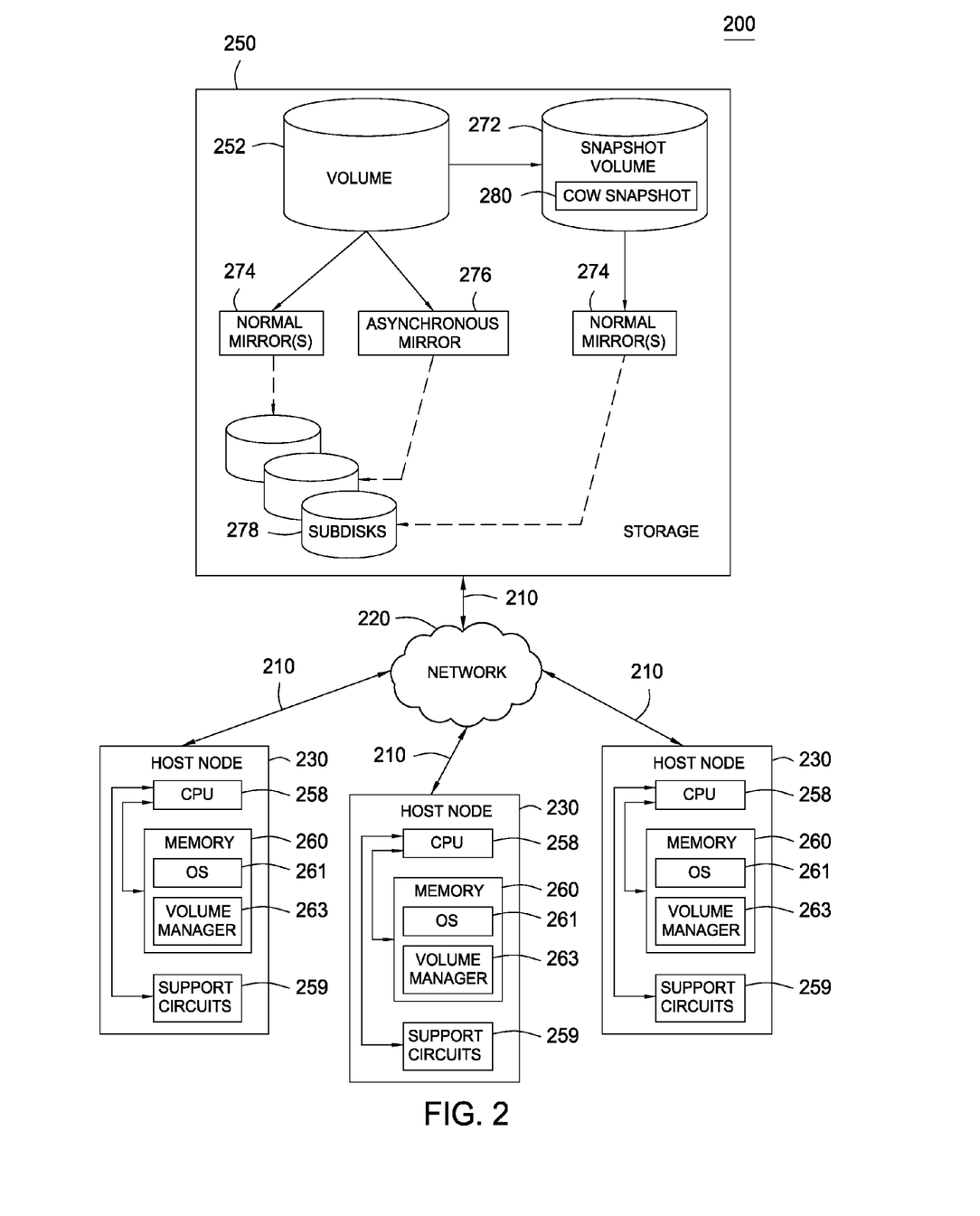
FIG. 2 is a block diagram of a multi-host system for asynchronously processing a write operation for a data storage volume having at least one copy-on-write snapshot, according to another exemplary embodiment of the present invention.

The present invention may also be employed in a multi-host (distributed) system 200, as shown in FIG. 2. The multi-host system 200 comprises a plurality of host nodes 230 coupled to at least one storage 250 comprising the volume 252 using a communication network 220. As stated for the single host system 100, the volume 252 comprises of mirrors 274 and 276, which in turn is a logical grouping construct of a plurality of subdisks 278. The host nodes 230 are similar to the host node 130 (FIG. 1), for example, a client computer system or a server computer system that includes logical volume management functionality in the form of programmable instructions executing on one or more data processors 258.

More specifically, each host node 230 comprises at least one central processing unit (CPU) 258, support circuits 259, and memory 260. The CPU 258 comprises at least one microprocessor or microcontroller. The support circuits 259 are well-known circuits that support the operation of the CPU 258 including, but not limited to, power supplies, clocks, cache, input/output circuits, network cards, and the like. The memory 260 may include dynamic or static random access memory, magnetic or optical data storage disks, or magnetic or optical data storage tapes, and the like. Other processing and memory means, including various computer readable media, may be used for storing and executing program instructions. The memory 260 stores executable software such as an operating system (OS) 261 and a volume manager 263. The volume manager 263 (which is distributed amongst the host nodes) provides logical volume management functionalities, in the form of programmable instructions executing on one or more processors 258. The volume manager 263 manages the distribution of data across several memory devices. The volume manager may support various specific storage management functionality, such as various levels of Redundant Array of Independent Disks (RAID) functionality including data mirroring, striping, and the like.

The storage 250 and the host nodes 230 are connected to the network 220 through communication means 210. The communication network 210 include, but is not limited to, a SCSI switch or a fiber channel (FC) switch. For example, by utilizing a FC switch to connect the host node 230 and the storage 250, the system 200 may provide high bandwidth, longer reach distance, the ability to share resources, enhanced availability, and other benefits of consolidated storage. Suitable forms of storage 150, 250 include, but are not limited to, tape drives, disk drives, RAIDs.

The host nodes 230 may be configured to receive access requests from clients (not shown) to access data stored in the storage 250. The host nodes 230 communicate with each other through the network 220. The network 220 may include wired or wireless communication mechanisms, for example, ethernet, local area network (LAN), a metropolitan area network (MAN), wide area network (WAN), modem, and the like. Any number of network topologies generally utilized in distributed computer systems may be used in a manner consistent with the present invention. The network 220 allows the multi-host system 200 to aggregate dispersed data centers into a single, unified, storage device.

Since the storage 250 is shared across the host nodes 230 in read/write mode, one or more locking mechanisms may be used in order to maintain the consistency of distributed data, Suitable locking mechanisms include, but are not limited to, shared locking, master mediated locking, Consistency Interval/Block Conflict Resolution (CI/BCR).

The storage 250 further comprises a snapshot volume 272, normal mirrors 274, and an asynchronous mirror 276. Also, a backup storage (not shown) may be present in a remote location to store copies of the data on the volume 252. The snapshot volume 272 contains the copies of PIT image of the snapshots that have been taken. Alternatively, the snapshots may be stored in a storage other than the storage 250.

Although a "host node" volume manager is shown and discussed herein as a executing on a computer system, the invention is applicable to any logical volume manager. Those skilled in the art will understand that the host node 230 may be a virtualization switch, storage array or any device that performs logical volume management.

Figure 3:
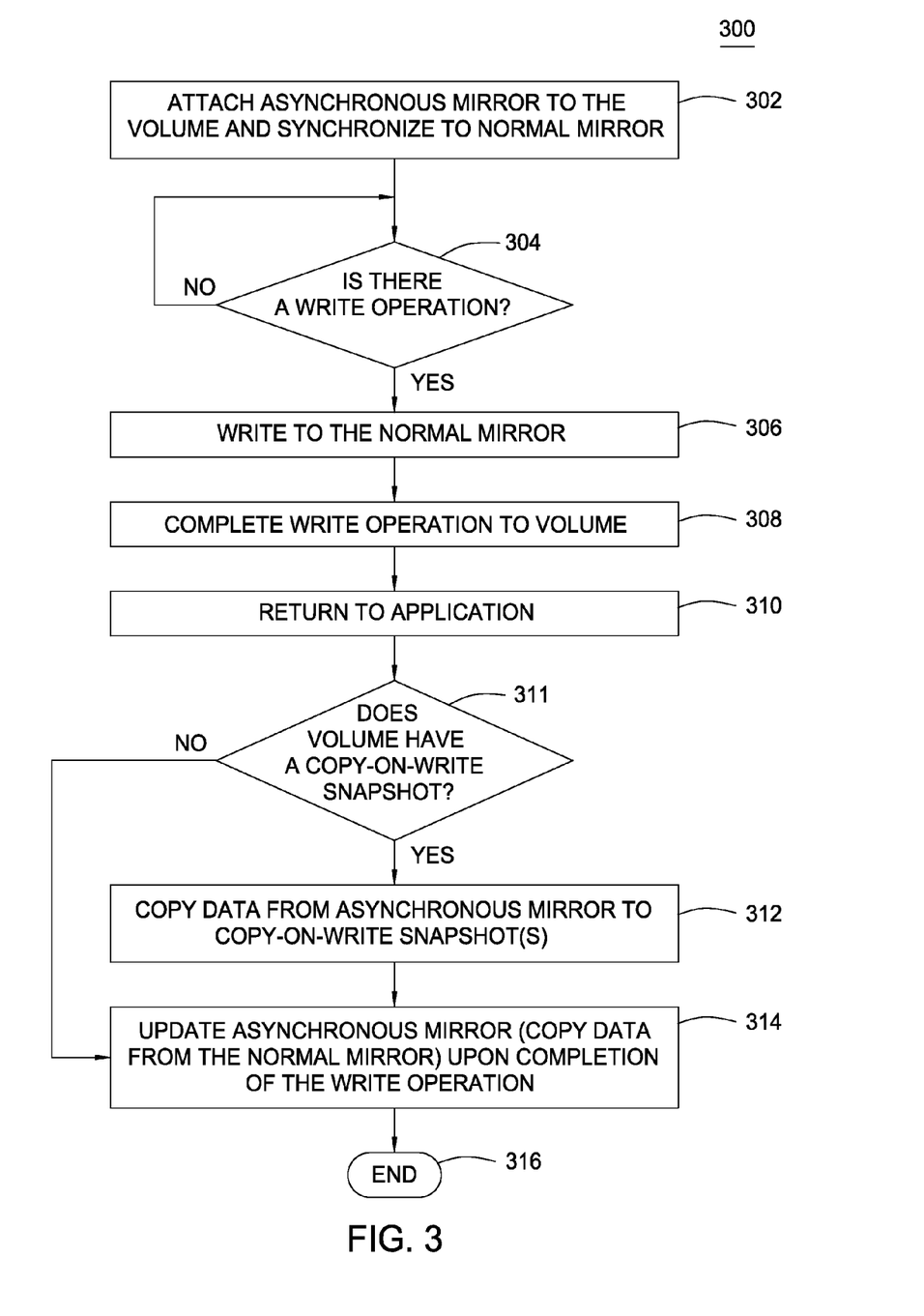
FIG. 3 is a flowchart of a method of asynchronously processing a write operation for a data storage volume having at least one copy-on-write snapshot, according to an exemplary embodiment of the present invention.

FIG. 3 is a flowchart of a method 300 for asynchronously processing a write operation for the data storage volume 152, 252 that utilizes at least one COW snapshot 180, 280. The method 300 operates in conjunction with either the embodiments of FIG. 1 or FIG. 2. Beginning at step 302, the asynchronous mirror 176, 276 is attached to the volume 152, 252 and brought into synchronization with the normal mirror 174, 274, i.e., synchronize with the existing data on the volume 152, 252. The decision step 304 then determines whether there is a write operation initiated by an application program or internally generated by the volume manager associated with the volume 152, 252. If there is no write operation, the method returns to repetitively check for write operations. Alternatively, the method 300 starting at step 308 is initiated on an interrupt basis upon the occurrence of a write request. On determination of a write operation initiated for the volume 152, 252, the method proceeds to step 306 where the normal mirrors 174, 274 are updated with write data associated with the write operation. At step 308, the write operation is completed for the volume 152, 252 and, at step 311, the method returns to the application (or volume manager). At this point, the application software requesting the write operation, or any other application, no longer waits for the write to complete, i.e., a "write complete" acknowledgement can be sent as soon as the data is written to the normal mirror 174, 274.

At step 311, the method 300 queries whether a COW snapshot exists. If a COW snapshot does not exist, the method 300 proceeds to step 314 wherein the data of the normal mirror is copied to the asynchronous mirror, i.e., the mirrors are synchronized. If a COW snapshot exists, the method 300 proceeds to step 312 where an asynchronous operation is initiated to copy the data from the asynchronous mirror 176, 276 to the COW snapshot 180, 280. In this manner, the data, as it existed prior to the write operation, is copied to the COW snapshot 180, 280. Subsequently, when the volume manager detects that the write operation is completed at step 310, the latest application data, i.e., the write data associated with the current write operation, is written to the asynchronous mirror 176, 276 from the normal mirrors 174, 274 at step 314. Then, at step 316, the method 300 ends. As such, by using the asynchronous mirror, an update of the COW snapshot occurs without causing the application to wait for write completion for the volume and snapshot. The asynchronous mirror is synchronized with the normal mirror after the COW snapshot is updated.

Figure 4:
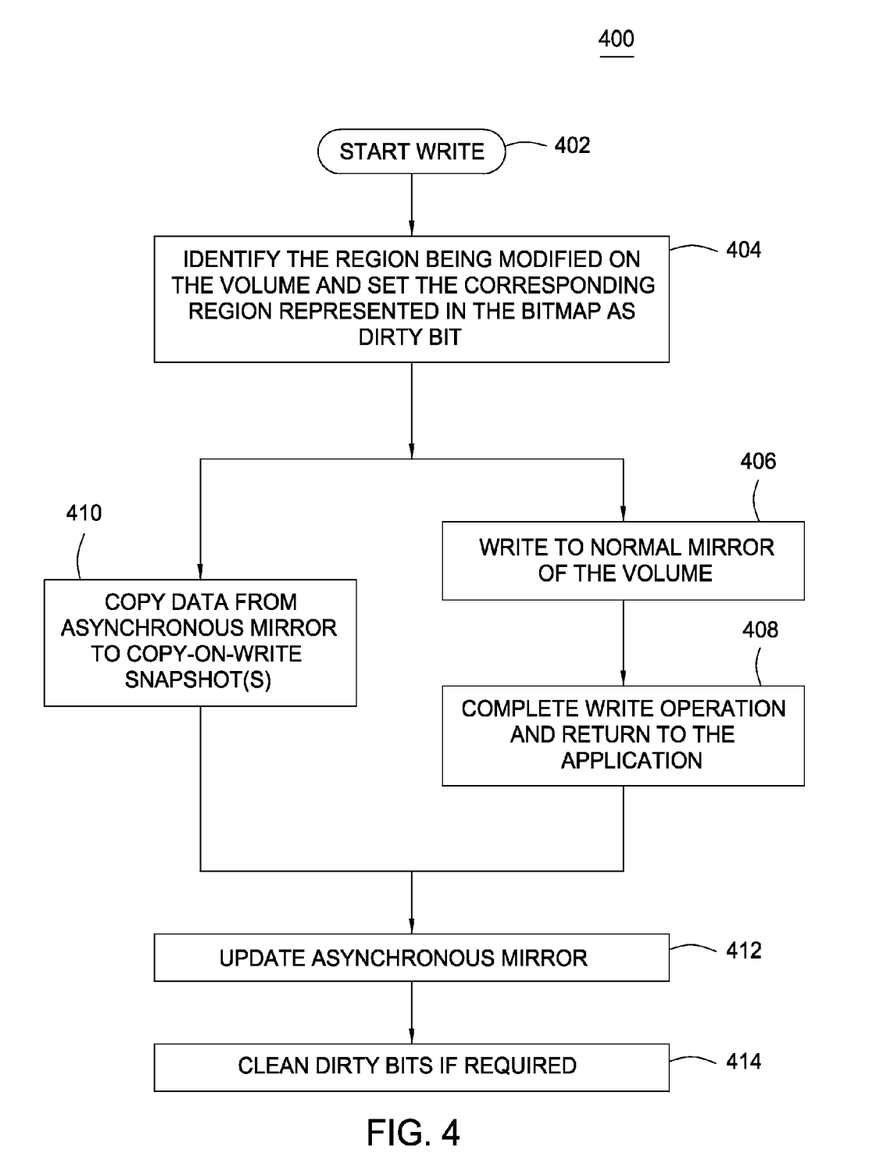
FIG. 4 is a flowchart illustrating a write operation for a data storage volume having at least one copy-on-write snapshot while tracking the modified regions of the volume in the single host system of FIG. 1, according to an exemplary embodiment of the present invention.

FIG. 4 is a flowchart of a method 400 of performing a write operation while tracking the modified regions of the volume 152 in a single host system 100 (See FIG. 1). The volume manager starts by initializing the write operation and a bitmap 139 is created representing regions of the volume 152. Beginning at step 402, a write operation is initiated by an application requesting to write data to the volume 152. Before performing the write operation, a region (blocks) on the volume 152 to be modified is identified and a corresponding region represented in the bitmap 139 is set as a dirty bit at step 404. After the dirty bit in the bitmap is set, at step 406, the normal mirrors 174 are updated with a write data associated with the write operation and simultaneously, at step 410, an asynchronous operation is initiated to copy the data to the COW snapshot 180. The asynchronous operation identifies the data blocks to be copied using the dirty bits of the bitmap as block identifiers. At step 408, the write operation is completed and a write acknowledgement is sent to the application that requested the write operation. Consequently, the application proceeds with other operations without waiting for the COW snapshots to be updated. After the write operation is completed at step 408, the asynchronous mirror 176 is updated with the write data at step 412. At step 416, the dirty bit in the bitmap may be cleared (if required). Generally, either the least recently or the most recently set dirty bit is cleared.

Using the modifications bit map 139, the present invention helps in crash recovery. Since systems do not record the modifications of the volume 152, 252, in case of system crash, a backup system generally synchronizes all the mirrors attached to the volume 152, 252 before making the volume 152, 252 available. However, since the present invention utilizes a bitmap (See FIG. 4 and FIG. 5) to track the modified regions of the volume 152, 252, in the event of a system crash, a backup system may synchronize only those regions that have been modified, thereby speeding up the synchronization process.

Since, the write operation on COW snapshot occurs asynchronously with respect to the application write, the write latency of the volume 152, 252 is same as the time it takes to write to both 'dirty region' bit in bitmap and its normal mirrors 174, 274. When a read operation is detected, then the contents may be directly read from the normal mirrors 174, 274 of the volume 152, 252. When a new snapshot is taken, the asynchronous mirror 176, 276 is brought in synchronization with the volume 152, 252 by waiting for all I/O's to quiesce on the normal mirrors 174, 274 as well as on the asynchronous mirror 176, 276 and the pending differences between the normal mirror 174, 274 and asynchronous mirror 176, 276 regions are synchronized.

In conventional distributed environments as shown in FIG. 2, the volume 252 is shared between host nodes 230 in read/write mode. The co-ordination of write operations to the volume 252 across host nodes 230 is controlled by the application that uses the volume 252. Accordingly, there is no need for the volume manager to explicitly synchronize (lock) the region for writing to the volume 252, since the application itself takes care of synchronizing write operations across the host nodes 230.

The presence of asynchronous mirror 276 introduces asynchronous write operation not controlled by the application initiating the write operation. Hence, the write operation is explicitly synchronized (locked across nodes) by the volume manager to ensure consistency of the asynchronous mirror 276. The synchronization across host nodes 230 may be achieved by various methods including, but not limited to, shared locking, master mediated locking, and Consistency Interval/Block Conflict Resolution (CI/BCR).

Figure 5:
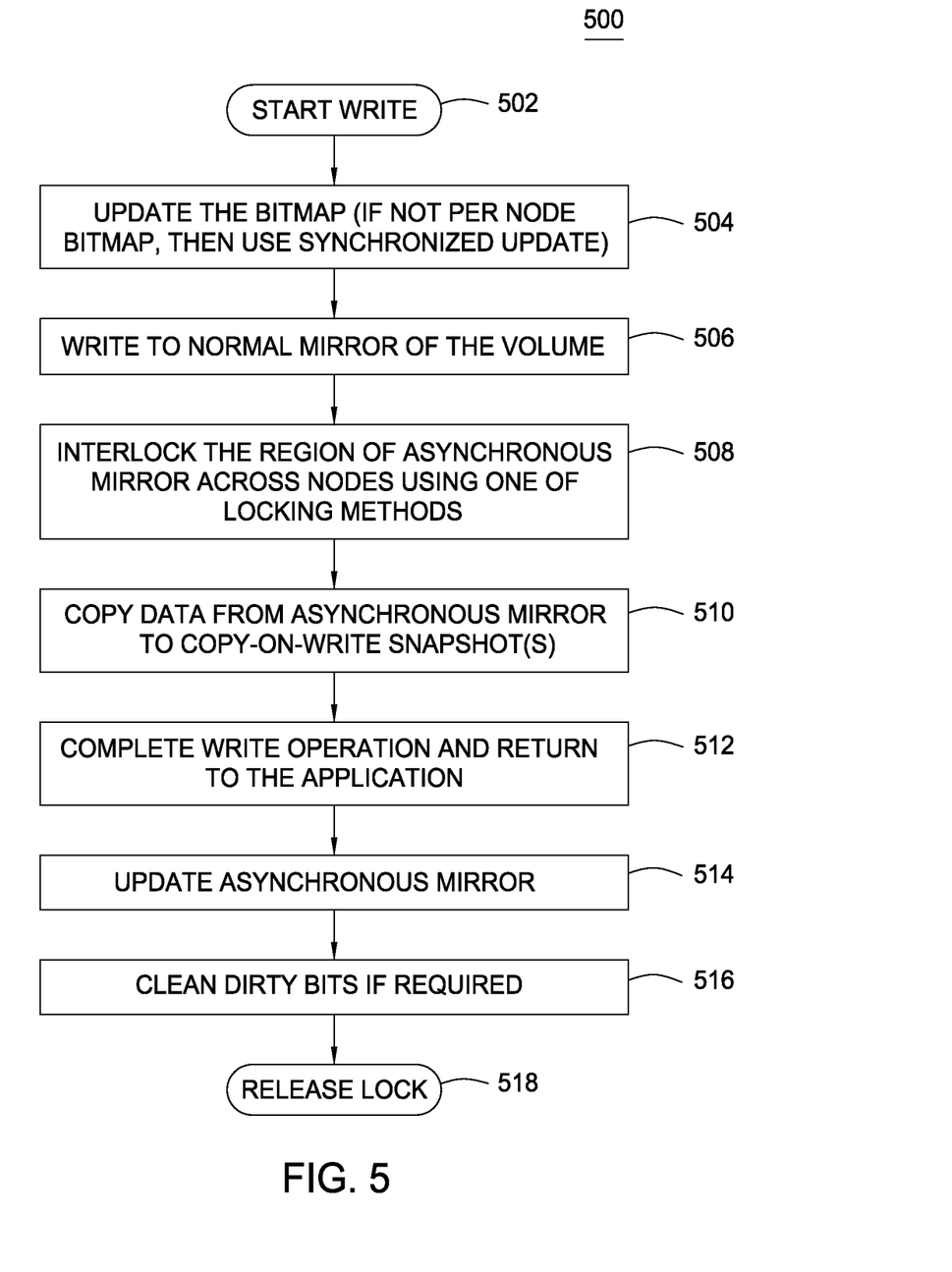
FIG. 5 is a flowchart illustrating a write operation for a data storage volume having at least one copy-on-write snapshot while tracking the modified regions of the volume in the multi-host system of FIG. 2, according to another exemplary embodiment of the present invention.

Referring now to FIG. 5, there is provided a flowchart of a method 500 of performing a write operation on a volume while tracking the modified regions of the volume 252 in a multi-host system 200. Beginning at step 502, a write operation is initiated by an application program or internally generated by the volume manager. Before performing the write operation, at step 504, the region on the volume 252 to be modified is identified and a corresponding region represented in the bitmaps of the host nodes 230 is set as dirty bit. At step 506, the normal mirrors 274 are updated with a write data associated with the write operation. At step 508, the corresponding region on the asynchronous mirror 276 is interlocked across the host nodes 230, using the aforesaid locking mechanisms. An asynchronous operation is initiated at step 510 to copy a copy data from the asynchronous mirror 276 to a COW snapshot. The write operation is returned to the application on completion of the write operation, as shown at step 512 and, at step 514, the asynchronous mirror 276 is updated with the write data from the normal mirror. At step 516 the dirty bit may be cleared, if required, and the lock is released at step 518. Steps 506 and 508 may be parally processed to improve the performance of the write operation on the volume 252, in which case step 512 would be completed, once both the steps 506 and step 508 are completed. Alternatively, the steps 508, 514, 516, and 518 may be implemented using CI/BCR. Also, in the multi-host system 200, since the read operations are performed directly on the normal mirrors 274 of the volume 252, there is no network message associated with the read operation, thereby reducing read latency.

Various embodiments may further include receiving, sending or storing instructions and or/data that implement the asynchronous write operation functionality on a volume having COW snapshots in accordance with the present invention, upon a computer readable medium. Such a computer readable medium may include but is not limited to a storage media or memory media such as magnetic media (e.g., floppy disks), optical media (e.g., disk or CD-ROM), volatile or non volatile media such as Random Access Memory (RAM), Read Only Memory (ROM), and the like, as well as transmission media or signals such as electrical, electromagnetic, or digital signals, conveyed via a communication means such as network and/or wireless link, wherein, when a computer program code, implementing the embodiments of the present invention, is loaded onto and executed by a computer, the computer becomes an apparatus for practicing the present invention. When implemented on a general-purpose microprocessor, the computer program code segments configure the microprocessor to create specific logic circuits.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is understood that various omissions, substitutions of equivalents are contemplated as circumstance may suggest or render expedient, but is intended to cover the application or implementation without departing from the spirit or scope of the claims of the present invention.

While the foregoing is directed to embodiments of the present invention, other and further embodiments of the invention may be devised without departing from the basic scope thereof, and the scope thereof is determined by the claims that follow.

What is claimed is:

1. A method comprising:
   synchronizing a first mirror with an asynchronous mirror, wherein
       the first mirror is configured as a mirror of a volume;
   receiving a write operation directed to the volume, wherein
       write data is associated with the write operation;
   writing the write data to a first location of the first mirror and to a corresponding location of the volume;
   transmitting an acknowledgement that indicates that the write operation is complete in response to the writing the write data;
   updating a copy-on-write (COW) snapshot of the volume, wherein the updating comprises copying data stored at a corresponding location of the asynchronous mirror to the COW snapshot;
copying the write data from the first mirror to the corresponding location of the asynchronous mirror subsequent to the updating the COW snapshot.

2. The method of claim 1, wherein
the updating the COW snapshot is performed concurrently with the writing the data.

3. The method of claim 1, further comprising:
receiving a read operation, wherein
the read operation is directed to the volume;
in response to the read operation, reading data from the first mirror.

4. The method of claim 1, further comprising:
interlocking the asynchronous mirror across a plurality of hosts prior to the updating the COW snapshot, wherein
the interlocking ensures data consistency across the plurality of hosts, and
the plurality of hosts is configured for shared access to the asynchronous mirror, and
unlocking the asynchronous mirror subsequent to the copying the write data to the corresponding location of the COW snapshot.

5. The method of claim 1, further comprising:
tracking modified regions of the volume using a bitmap;
identifying regions of the asynchronous mirror to copy to the COW snapshot based on modified regions in the bitmap.

6. The method of claim 1, further comprising:
detecting creation of a second snapshot;
in response to the detecting, re-synchronizing the asynchronous mirror with the volume.

7. The method of claim 6, wherein
the re-synchronizing comprises
waiting until all pending input/output requests to the first mirror have completed,
waiting until all pending input/output requests to the asynchronous mirror have completed, and
detecting that all regions of the first mirror are synchronized to corresponding regions of the asynchronous mirror.

8. A non-transitory computer readable medium comprising program instructions executable to:
synchronize a first mirror with an asynchronous mirror, wherein
the first mirror is configured as a mirror of a volume;
receive a write operation directed to the volume, wherein write data is associated with the write operation;
write the write data to a first location of the first mirror and to a corresponding location of the volume;
transmit an acknowledgement that indicates that the write operation is complete in response to the writing the write data;
update a copy-on-write (COW) snapshot of the volume, wherein
updating the COW snapshot comprises copying data stored at a corresponding location of the asynchronous mirror to the COW snapshot;
copy the write data from the first mirror to the corresponding location of the asynchronous mirror subsequent to the updating the COW snapshot.

9. The non-transitory computer readable medium of claim 8, wherein
updating the COW snapshot is performed concurrently with the writing the data.

10. The non-transitory computer readable medium of claim 8, wherein the program instructions are further executable to:
receive a read operation, wherein
the read operation is directed to the volume;
in response to the read operation, read data from the first mirror.

11. The non-transitory computer readable medium of claim 8, wherein the program instructions are further executable to:
interlock the asynchronous mirror across a plurality of hosts prior to the updating the COW snapshot, wherein
interlocking ensures data consistency across the plurality of hosts, and
the plurality of hosts is configured for shared access to the asynchronous mirror, and
unlock the asynchronous mirror subsequent to the copying the write data to the corresponding location of the COW snapshot.

12. The non-transitory computer readable medium of claim 8, wherein the program instructions are further executable to:
track modified regions of the volume using a bitmap;
identify regions of the asynchronous mirror to copy to the COW snapshot based on modified regions in the bitmap.

13. The non-transitory computer readable medium of claim 8, wherein the program instructions are further executable to:
detect creation of a second snapshot; and
in response to detecting creation of a second snapshot, re-synchronize the asynchronous mirror with the volume.

14. The non-transitory computer readable medium of claim 13, wherein
the re-synchronizing comprises
waiting until all pending input/output requests to the first mirror have completed,
waiting until all pending input/output requests to the asynchronous mirror have completed, and
detecting that all regions of the first mirror are synchronized to corresponding regions of the asynchronous mirror.

15. A system comprising:
a processor; and
a memory coupled to the processor, wherein the memory stores program instructions executable by the processor to:
synchronize a first mirror with an asynchronous mirror, wherein
the first mirror is configured as a mirror of a volume;
receive a write operation directed to the volume, wherein write data is associated with the write operation;
write the write data to a first location of the first mirror and to a corresponding location of the volume;
transmit an acknowledgement that indicates that the write operation is complete in response to the writing the write data;
update a copy-on-write (COW) snapshot of the volume, wherein
updating the COW snapshot comprises copying data stored at a corresponding location of the asynchronous mirror to the COW snapshot;
copy the write data from the first mirror to the corresponding location of the asynchronous mirror subsequent to the updating the COW snapshot.

16. The system of claim 15, wherein updating the COW snapshot is performed concurrently with the writing the data.

17. The system of claim 15, wherein the program instructions are further executable to:
receive a read operation, wherein
the read operation is directed to the volume;

in response to the read operation, read data from the first mirror.

18. The system of claim 15, wherein the program instructions are further executable to:
   track modified regions of the volume using a bitmap;
   identify regions of the asynchronous mirror to copy to the COW snapshot based on modified regions in the bitmap.

19. The system of claim 15, wherein the program instructions are further executable to:
   detect creation of a second snapshot; and
   in response to detecting creation of a second snapshot, re-synchronize the asynchronous mirror with the volume.

20. The system of claim 19, wherein
   the re-synchronizing comprises
      waiting until all pending input/output requests to the first mirror have completed,
      waiting until all pending input/output requests to the asynchronous mirror have completed, and
      detecting that all regions of the first mirror are synchronized to corresponding regions of the asynchronous mirror.

* * * * *